US009755796B2

(12) United States Patent
Haque et al.

(10) Patent No.: US 9,755,796 B2
(45) Date of Patent: Sep. 5, 2017

(54) SYSTEM AND METHOD OF USING RADIO ALTIMETER FREQUENCY SPECTRUM FOR WIRELESS SIGNALS

(71) Applicant: Honeywell International Inc., Morristown, NJ (US)

(72) Inventors: Jamal Haque, Clearwater, FL (US); Michael R. Franceschini, Centerport, NY (US)

(73) Assignee: Honeywell International Inc., Morris Plains, NJ (US)

( * ) Notice: Subject to any disclaimer, the term of this patent is extended or adjusted under 35 U.S.C. 154(b) by 169 days.

(21) Appl. No.: 14/660,998

(22) Filed: Mar. 18, 2015

(65) Prior Publication Data
US 2016/0277161 A1  Sep. 22, 2016

(51) Int. Cl.
H04W 4/00 (2009.01)
H04L 5/00 (2006.01)
H04J 11/00 (2006.01)
G01C 5/00 (2006.01)
H04B 7/185 (2006.01)
(Continued)

(52) U.S. Cl.
CPC ............ *H04L 5/0007* (2013.01); *G01C 5/005* (2013.01); *H04B 7/18506* (2013.01); *H04J 11/00* (2013.01); *H04L 5/0012* (2013.01); *H04L 5/0062* (2013.01); *H04L 27/0006* (2013.01); *H04L 27/2634* (2013.01); *H04J 2011/0096* (2013.01)

(58) Field of Classification Search
None
See application file for complete search history.

(56) References Cited

U.S. PATENT DOCUMENTS 4,733,239 A * 3/1988 Schmitt ................. G01S 7/4021
342/122
6,750,807 B1 * 6/2004 Hager ....................... G01S 7/03
342/120
(Continued)

OTHER PUBLICATIONS

"4200-4400 MHz", "Retrieved Mar. 16, 2015 from http://www.ntia.doc.gov/files/ntia/publications/compendium/4200.00-4400.00_01MAR14.pdf", Mar. 1, 2014, pp. 1-9.
(Continued)

*Primary Examiner* — Bob Phunkulh
(74) *Attorney, Agent, or Firm* — Fogg & Powers LLC

(57) ABSTRACT

An avionics system comprises a plurality of avionics components; at least one OFDM transmitter coupled to a respective one or more of the plurality of avionics components and configured to transmit a wireless OFDM signal comprising a plurality of sub-bands; at least one OFDM receiver coupled to a respective one or more of the plurality of avionics components and configured to receive the wireless OFDM signal transmitted by the OFDM transmitter; and a radio altimeter configured to transmit a signal tone that sweeps a frequency spectrum allocated to the radio altimeter at a predefined rate and periodicity. The at least one OFDM transmitter is configured to transmit the wireless OFDM signal in the frequency spectrum allocated to the radio altimeter and to sequentially turn off respective subsets of the plurality of sub-bands in synchronization with the predefined rate and periodicity of the signal tone frequency sweep.

20 Claims, 4 Drawing Sheets

(51) Int. Cl.
*H04L 27/00* (2006.01)
*H04L 27/26* (2006.01)

(56) References Cited

U.S. PATENT DOCUMENTS

| | | |
|---|---|---|
| 7,427,938 B2 | 9/2008 | Kim |
| 7,777,668 B2 | 8/2010 | Becker et al. |
| 8,442,519 B2 | 5/2013 | Cruz et al. |
| 8,700,077 B2 | 4/2014 | Schmidt |
| 8,884,811 B2 | 11/2014 | Zwick et al. |
| 9,398,635 B1 * | 7/2016 | Nadji ............... H04W 80/06 |
| 2005/0259758 A1 * | 11/2005 | Razzell ............... H04L 5/026 375/260 |
| 2011/0279669 A1 * | 11/2011 | Longstaff ............. G01S 13/882 348/135 |
| 2014/0002302 A1 * | 1/2014 | Robinson ............... G01S 19/02 342/357.32 |
| 2014/0226609 A1 | 8/2014 | Hooli et al. |

OTHER PUBLICATIONS

"Wireless Avionics Intra-Communications (WAIC)", 2011, pp. 1-15, Publisher: Aerospace Vehicle Systems Institute.

Ghorbanzadeh et al., "Spectrum Sharing between Radar and Communication Systems", "Wireless@VT Student Seminar Series", Nov. 21, 2014, pp. 1-46.

Hayvaci et al., "Spectrum Sharing in Radar and Wireless Communication Systems: A Review", "IEEE International Conference on Electromagnetics in Advanced Applications (ICEAA)", Aug. 3-8, 2014, pp. 810-813, Publisher: IEEE.

Hutchison, "Comments of Aviation Spectrum Resources, Inc.", "In the Matter of Spectrum Task Force Requests Information on Frequency Bands Identified by NTIA as Potential Broadband Spectrum", Apr. 22, 2011, pp. 1-14.

Locke et al., "An Assessment of the Near-Term Viability of Accommodating Wireless Broadband Systems in the 1675-1710 MHz, 1755-1780 MHz, 3500-3650 MHz, and 4200-4220 MHz, 4380-4400 MHz Bands", Oct. 2010, pp. 1-262, Publisher: U.S. Department of Commerce.

Obregon et al., "Secondary Access to the Radar Spectrum Bands: Regulatory and Business Implications", "24th European Regional Conference of the International Telecommunications Society", 2013, pp. 1-14, Published in: IT.

* cited by examiner

SYSTEM AND METHOD OF USING RADIO ALTIMETER FREQUENCY SPECTRUM FOR WIRELESS SIGNALS

BACKGROUND

Conventional aircraft communication systems include operational communication systems onboard the aircraft, as well as sensors for environmental safety, engine, landing gear, proximity detection, etc. Traditional communication systems require complex electrical wiring and harness fabrication which adds weight to the aircraft. These system also often rely on double or triple redundancy to mitigate the risk of cut or defective wiring.

The advent of reliable wireless communication makes feasible the use of wireless signals for onboard communications, both inside and outside the aircraft. These communication systems could be used for various applications including sensors, actuators, flight crew applications, etc. However, communications for aircraft safety services and regularity of flight require protected aeronautical spectrum that is not shared with unlicensed systems, such as Industrial, Scientific and Medical (ISM) systems or Wi-Fi. Additionally, the available frequency spectrum for such wireless avionic communications is limited.

SUMMARY

In one embodiment, an avionics system is provided. The avionics system comprises a plurality of avionics components; at least one orthogonal frequency division multiplex (OFDM) transmitter coupled to a respective one or more of the plurality of avionics components and configured to transmit a wireless OFDM signal comprising a plurality of sub-bands; at least one OFDM receiver coupled to a respective one or more of the plurality of avionics components and configured to receive the wireless OFDM signal transmitted by the OFDM transmitter; and a radio altimeter configured to transmit a signal tone that sweeps a frequency spectrum allocated to the radio altimeter at a predefined rate and periodicity. The at least one OFDM transmitter is configured to transmit the wireless OFDM signal in the frequency spectrum allocated to the radio altimeter. The at least one OFDM transmitter is configured to sequentially turn off respective subsets of the plurality of sub-bands in synchronization with the predefined rate and periodicity of the signal tone frequency sweep.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
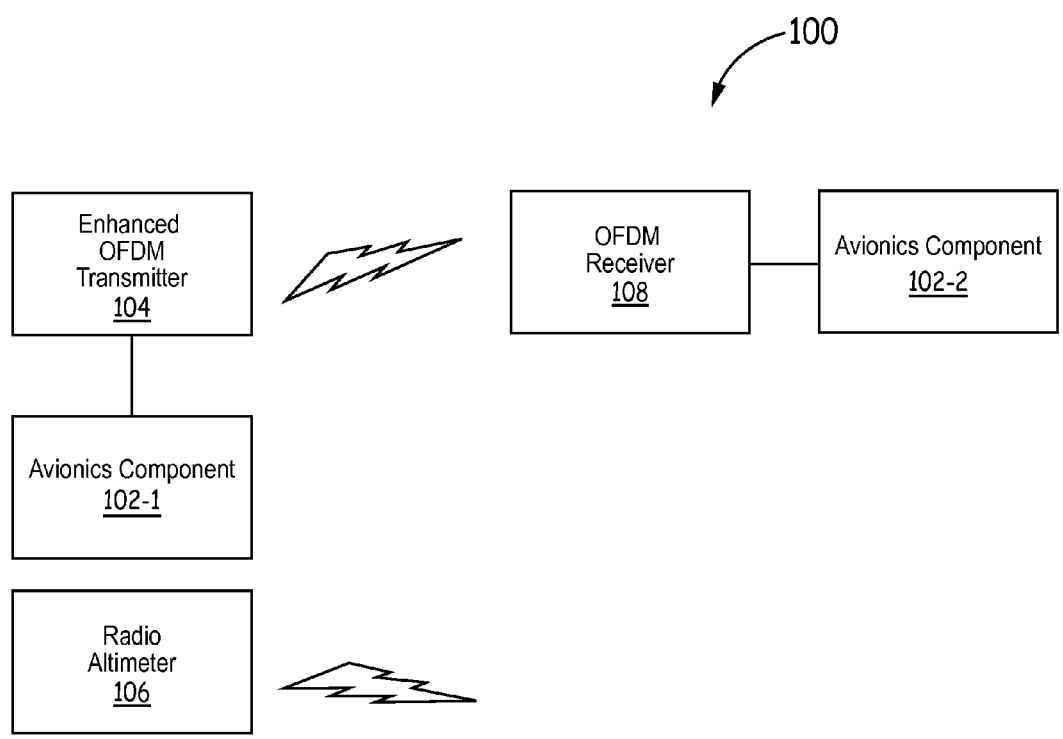
FIG. 1 is a block diagram of one embodiment of an exemplary avionics system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of one embodiment of an exemplary avionics system 100. System 100 includes a plurality of avionics components 102 which are configured to communicate with each other wirelessly. The avionics components 102 can be implemented as any suitable component on an aircraft which needs to communicate with another component. For example, the avionics components 102 can be implemented as actuators, sensors, line replaceable units, etc. For example, suitable actuators can include, but not limited to, passenger speakers, passenger displays, oxygen release units, etc. which respond to commands from the flight crew to provide information to passengers or to perform an action. Additionally, suitable sensors can include, but not limited to, brake condition monitors, tire pressure monitors, engine sensors, etc. which provide information to a control unit configured to analyze and/or provide the sensor data to a flight crew. Although only two avionics components are shown in FIG. 1, for purposes of explanation, it is to be understood that more than two avionics components can be used in other embodiments. Hence, system 100 can be implemented as any avionics system onboard the aircraft which includes two or more components which communicate with each other wirelessly, either bi-directionally or in a single communication direction.

System 100 uses any onboard wireless technology for communication between the avionics components 102. Such wireless technology is known to one of skill in the art and not discussed in more detail herein. In this example, the avionics component 102-1 is coupled to an enhanced Orthogonal Frequency Division Multiplex (OFDM) transmitter 104 and avionics component 102-2 is coupled to an OFDM receiver 108. Hence, avionics component 102-1 communicates wirelessly with avionics component 102-2 using OFDM signals. As understood by one of skill in the art, an OFDM signal consists of a number of closely spaced modulated carriers. Although the sidebands from each carrier overlap, they can still be received without the interference that might be expected because they are orthogonal to each other.

The system 100 also includes a radio altimeter (RA) 106. The RA 106 is configured to transmit a single signal tone (e.g. Frequency Modulated Continuous Wave (FMCW) tone) with known power toward the ground or surface. The single signal tone sweeps the spectrum allocated to the RA 106 with a pre-defined rate and periodicity. In particular, in this example, the RA 106 is allocated a spectrum of 4200 MHz-4400 MHz. However, the RA 106 may only utilize a portion of the allocated spectrum. For example, the RA 106 may only utilize a span of 4235 MHz-4365 MHz. It is to be understood that other frequency spectra can be allocated for use by the RA 106 in other embodiments. Similarly, the RA 106 may utilize other portions of the allocated spectrum in other embodiments. The signal tone interacts with the ground or surface beneath the aircraft and part of the incident signal tone reflects back to the RA 106. By measuring the amount of time it takes to receive the reflection, the RA 106 is able to determine the altitude of the aircraft on which the system 100 is located. Operation of a radio altimeter is known to one of skill in the art and not discussed in more detail herein.

One challenge facing wireless avionics systems is the limited amount of available frequency spectrum for wireless communications. The embodiments described herein address the problem of limited frequency spectrum by configuring the enhanced OFDM transmitter 104 in system 100 to use the bandwidth allocated to the RA 106 without interfering with the conventional operation of the RA 106. In particular, the operation of the RA 106 is critical to flight safety and, hence, system 100 is configured to share the bandwidth allocated to the RA 106 without impacting performance of the RA 106.

As discussed above, the FMCW RA 106 outputs a single signal tone which linearly sweeps through the allocated bandwidth. Thus, the RA 106 is only using a portion of the allocated bandwidth at a given point in time. The enhanced OFDM transmitter 104 and the OFDM receiver 108 are synchronized with the periodicity and rate of sweep of the RA signal. For example, synchronization can be achieved by tracking the RA signal and using it to manage the OFDM carriers. As stated above, the periodicity and rate of sweep of the RA signal is predetermined in some embodiments. Hence, in some such embodiments, the enhanced OFDM transmitter 104 and OFDM receiver 106 are configured with the predetermined values for periodicity and sweep rate.

Figure 2A:
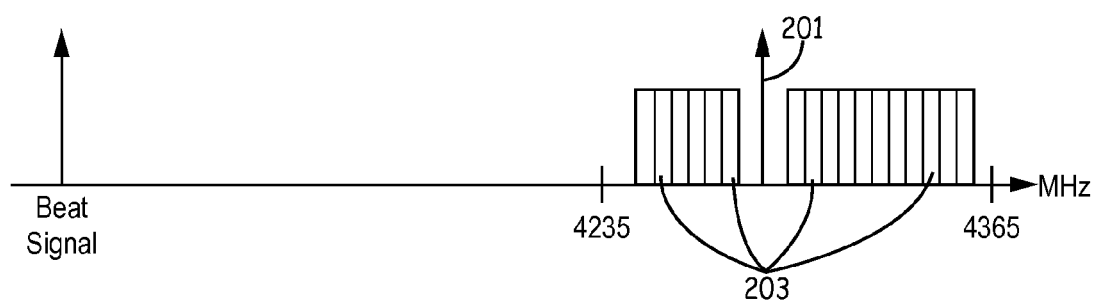
FIGS. 2A and 2B depict an exemplary frequency spectrum allocated to a radio altimeter.
Figure 2B:
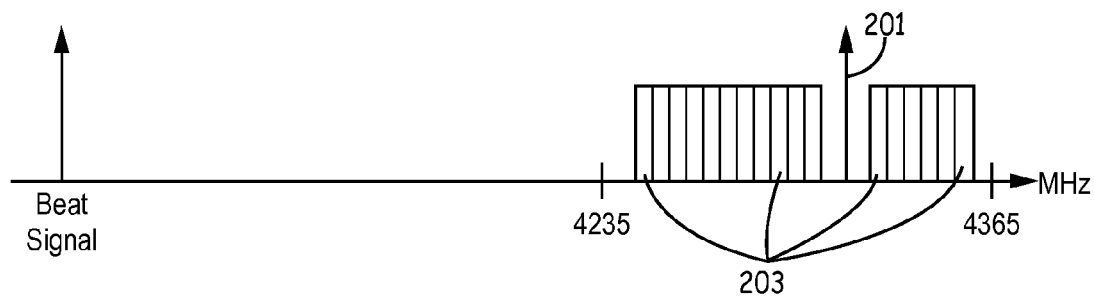

Based on the periodicity and sweep rate of the signal tone output by the RA 106, the OFDM transmitter 104 is configured to selectively turn off a respective sub-band of the OFDM signal (e.g. insert zeros) which overlaps the frequency of the signal tone from the RA 106 at a given point in time. For example, FIGS. 2A and 2B depict a graph of an exemplary frequency spectrum allocated to the RA 106. In particular, in the example of FIG. 2, the RA 106 occupies a frequency spectrum of 4235 MHz to 4365 MHz. The signal tone 201 sweeps through the utilized frequency spectrum at a pre-defined periodicity and sweep rate, as mentioned above. Thus, at any given point in time, the signal tone 201 occupies only a portion of the allocated frequency spectrum. For example, in the exemplary FIG. 2A, the instantaneous transmitted signal tone 201 is located at a first frequency between 4235 MHz and 4365 MHz. However, at a subsequent time, the instantaneous transmitted signal tone 201 is located at a second frequency, as shown in FIG. 2B. The enhanced OFDM transmitter 104 is configured to transmit a signal having sub-bands 203 in the unused portion of the frequency spectrum allocated to the RA 106 and to selectively turn off the respective sub-bands 203 when they correspond to the frequency of the RA signal tone 201, as shown in FIGS. 2A and 2B. In particular, in one embodiment, to avoid interference between the OFDM signal and the signal tone 201 as the signal tone 201 travels across the spectrum, the OFDM transmitter 104 does not modulate any data on the respective sub-band or inserts zeros for the duration of the respective sub-band, effectively turning off the respective sub-band.

In addition, the enhanced OFDM transmitter 104 is configured, in some embodiments, to use sub-bands or carriers which have a bandwidth equal to or greater than 2 or more times the beat bandwidth of the RA 106. The beat bandwidth is the bandwidth of the beat signal produced by the transmitted signal tone and the received reflection. In one such embodiment, the beat bandwidth is approximately 50 KHz. Thus, the enhanced OFDM transmitter 104 is configured to utilize sub-bands having a bandwidth equal to or greater than 100 KHz in this embodiment. By using a bandwidth equal to or greater than two times the beat bandwidth for each sub-band, enough bandwidth is preserved for the reflected signal to be received without interference from signals transmitted by the enhanced OFDM transmitter 104. In addition, it is to be understood that in some embodiments, more than one RA signal is transmitted by the RA 106. In such embodiments, the enhanced OFDM transmitter 104 is configured to simultaneously notch or effectively turn off respective sub-bands to avoid each RA signal.

Although a single OFDM transmitter 104 and OFDM receiver 108 are shown in FIG. 1, for purposes of explanation, it is to be understood that more than one OFDM transmitter 104 and/or more than one OFDM receiver 108 can be used in other embodiments. For example, in some embodiments, a plurality of OFDM transmitters are implemented with each OFDM transmitter integrated into a respective avionics component. In other embodiments, a single OFDM transmitter can be coupled to two or more avionics components to transmit data from each of the two or more avionics components. Furthermore, in some embodiments, the radio altimeter 106 is an avionics component coupled to the OFDM transmitter 104 for wireless transmission of altitude measurement data.

Figure 3:
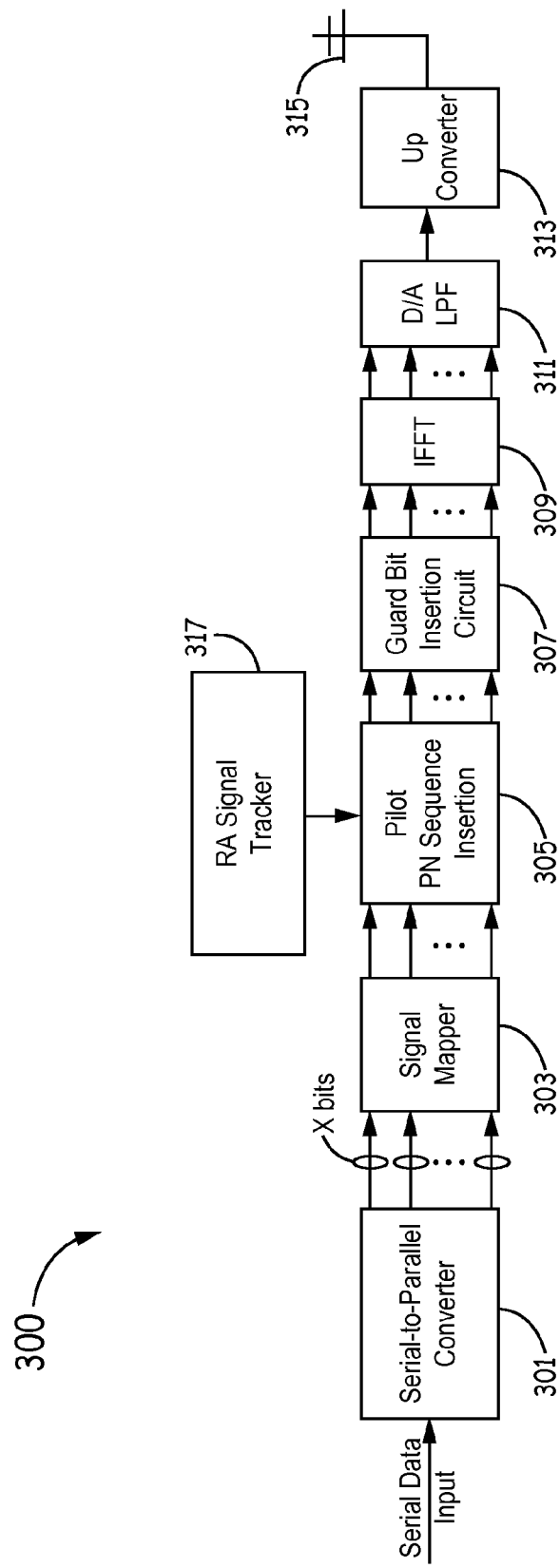
FIG. 3 is a block diagram of one embodiment of an exemplary orthogonal frequency division multiplex transmitter.

One embodiment of an exemplary enhanced OFDM transmitter 300 is shown in FIG. 3. The enhanced OFDM transmitter 300 can be used to implement the enhanced OFDM transmitter 104 discussed above. The enhanced OFDM transmitter 300 includes a serial-to-parallel converter 301 configured to convert input serial data into a parallel data stream of x bits, where x is the number of bits. The enhanced OFDM transmitter 300 also includes a signal mapper 303 coupled to the serial-to-parallel converter 301 and configured to map or modulate the bits of the parallel data stream. For example, in some embodiments, the signal mapper 303 is configured to implement a Phase Shift Keying (PSK) modulation (e.g. Binary PSK or Quadrature PSK). In other embodiments, the signal mapper 303 is configured to implement other modulation schemes, such as, but not limited to, Quadrature Amplitude Modulation (QAM).

The pilot pseudo noise (PN) sequence insertion unit 305 is configured to insert pilot signals to aid in channel estimation and synchronization between the enhanced OFDM transmitter 300 and an OFDM receiver, as understood by one of skill in the art. The guard bit insertion unit 307 inserts a guard interval to reduce inter-symbol interference (ISI) caused by multipath distortion, as understood by one of skill in the art. The output of the guard bit insertion unit 307 is converted to an OFDM signal by the inverse Fast Fourier Transform (iFFT) 309. The OFDM signal from the iFFT is then converted to an analog signal and passed through a low-pass filtered (LPF) in the converter 311, as known to one of skill in the art. The filtered analog signal is then upconverted in the upconverter 313 for radio frequency (RF) transmission and radiated from antenna 315, as known to one of skill in the art.

The enhanced OFDM transmitter 300 also includes a RA signal tracker 317. The RA signal tracker 317 is configured to track the periodicity and sweep rate of the signal tone output by a radio altimeter. In other words, the RA signal tracker 317 is configured to maintain synchronization between the enhanced OFDM transmitter 300 and a radio altimeter. The RA signal tracker 317 provides an input to the pilot PN sequence insertion unit 305 which causes the pilot PN sequence insertion unit 305 to insert zero values for the sub-carrier corresponding to the frequency of the signal tone output by the radio altimeter. Since the sub-carrier corresponding to the frequency of the signal tone contains zero values, no data is modulated for the respective sub-carrier and the power of the OFDM signal in that respective sub-carrier is approximately zero. Thus, the sub-carrier corresponding to the frequency of the signal tone is effectively turned off.

By selectively turning off respective sub-bands in synchronization with the frequency sweep and periodicity of the signal tone, the embodiments described herein enable the use of the frequency bandwidth allocated to a radio altimeter for communicating data between avionic components without interfering with the operation of the radio altimeter. Thus, the embodiments described herein help alleviate the problem of limited bandwidth for wireless communication between avionic components by permitting effective sharing of the bandwidth without interference to either the radio altimeter or the communications between avionic components.

One or more of the components of the enhanced OFDM transmitter 300 can be implemented with a processing device, such as a field programmable gate array (FPGA), application specific integrated circuit (ASIC), or microprocessor, that is configured to perform the function of the respective component. For example, in some embodiments, a processing unit is configured to execute instructions stored on a tangible medium to perform the respective function. In such embodiments, the processing unit includes or functions with software programs, firmware or other computer readable instructions for carrying out various methods, process tasks, calculations, and control functions, used in transmitting the OFDM signal and selectively turning off sub-bands in synchronization with the signal tone frequency sweep.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Figure 4:
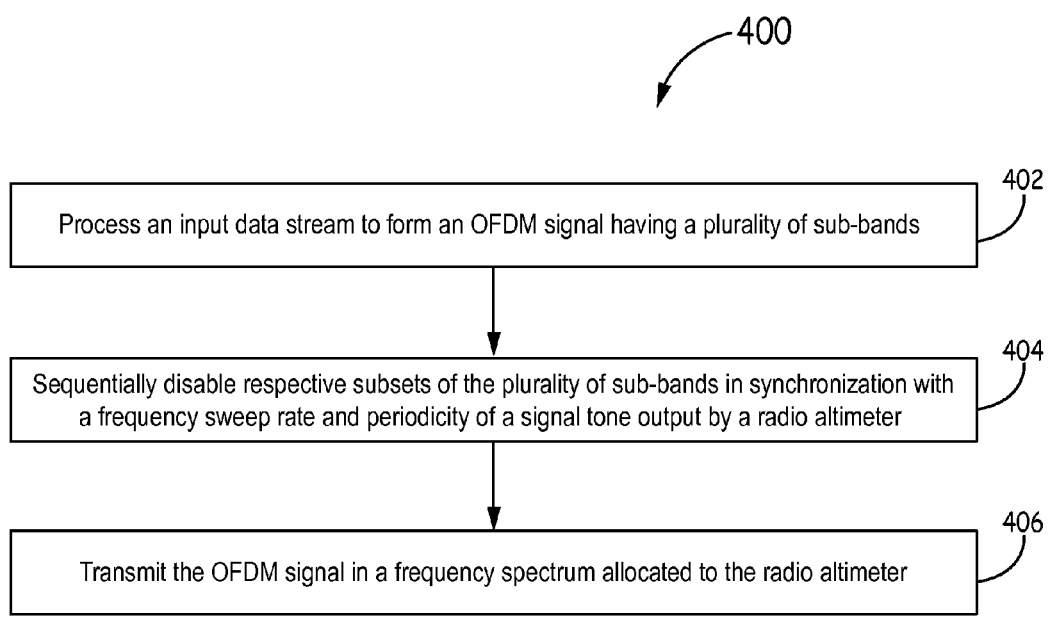
FIG. 4 is a flow chart depicting one embodiment of an exemplary method of communicating data.

FIG. 4 is a flow chart of one embodiment of an exemplary method 400 of communicating data. The method 400 can be implemented by an OFDM transmitter such as enhanced OFDM transmitters 104 and 300 discussed above. At block 402, an input data stream is processed to form an OFDM signal having a plurality of sub-bands, as discussed above. At block 404, respective subsets of the plurality of sub-bands are sequentially disabled in synchronization with a frequency sweep rate and periodicity of a signal tone output by a radio altimeter such that only the respective disabled subsets overlap the signal tone. In other words, as discussed above, as the signal tone sweeps the frequency spectrum allocated to the radio altimeter at a given rate and periodicity, each subset of sub-bands that would overlap the signal tone at any given point in time is disabled such that the signal tone only overlaps disabled subsets. In some embodiments, disabling each respective subset of the plurality of sub-bands comprises inserting zeros into the portion of the OFDM signal corresponding to each respective subset.

As used herein, the term "subset" refers to an exclusive group of at least one, but less than all, of the plurality of sub-bands. Thus, each sub-band is a member of only one subset. In some embodiments, each subset only comprises a single sub-band. In other embodiments, each subset comprises a two or more sub-bands. Furthermore, in some embodiments, each subset is configured so that the bandwidth of each subset is equal to or greater than two times a beat bandwidth of the radio altimeter. In embodiments where each subset comprises a single sub-band, each sub-band has a bandwidth equal to or greater than two times the beat bandwidth. In embodiments where each subset comprises two or more sub-bands, the aggregate total bandwidth of the sub-bands in each subset is equal to or greater than two times the beat bandwidth. At block 406, the OFDM signal is transmitted in the frequency spectrum allocated to the radio altimeter.

EXAMPLE EMBODIMENTS

Example 1 includes an avionics system comprising: a plurality of avionics components; at least one orthogonal frequency division multiplex (OFDM) transmitter coupled to a respective one or more of the plurality of avionics components and configured to transmit a wireless OFDM signal comprising a plurality of sub-bands; at least one OFDM receiver coupled to a respective one or more of the plurality of avionics components and configured to receive the wireless OFDM signal transmitted by the OFDM transmitter; and a radio altimeter configured to transmit a signal tone that sweeps a frequency spectrum allocated to the radio altimeter at a predefined rate and periodicity; wherein the at least one OFDM transmitter is configured to transmit the wireless OFDM signal in the frequency spectrum allocated to the radio altimeter; wherein the at least one OFDM transmitter is configured to sequentially turn off respective subsets of the plurality of sub-bands in synchronization with the predefined rate and periodicity of the signal tone frequency sweep.

Example 2 includes the avionics system of Example 1, wherein each subset of the plurality of sub-bands comprises a single sub-band.

Example 3 includes the avionics system of Example 2, wherein the single sub-band has a bandwidth equal to or greater than two times a beat bandwidth of the radio altimeter.

Example 4 includes the avionics system of Example of Example 3, wherein the beat bandwidth is approximately equal to 50 KHz.

Example 5 includes the avionics system of any of Examples 1-4, wherein the frequency spectrum allocated to the radio altimeter ranges from 4200 MHz to 4400 MHz.

Example 6 includes the avionics system of any of Examples 1-5, wherein the OFDM transmitter is configured to turn off each respective subset of the plurality of sub-bands by inserting zeros into the portion of the OFDM signal corresponding to each respective subset.

Example 7 includes the avionics system of any of Examples 1-6, wherein the plurality of avionics components includes the radio altimeter, the radio altimeter being coupled to the OFDM transmitter for transmission of an OFDM signal containing altitude measurements.

Example 8 includes the avionics system of any of Examples 1-7, wherein the at least one OFDM transmitter comprises a plurality of OFDM transmitters, each of the plurality of OFDM transmitters integrated into a respective one of the plurality of avionics components.

Example 9 includes the avionics system of any of Examples 1-8, wherein the at least one OFDM transmitter is coupled to two or more of the plurality of avionics components such that each of the two or more avionics components communicate wirelessly via the same OFDM transmitter.

Example 10 includes the avionics system of any of Examples 1-9, wherein each of the plurality of avionics components comprises one of an actuator, a sensor, or a control unit.

Example 11 includes a method of communicating data, the method comprising: processing an input data stream to form an orthogonal frequency division multiplex (OFDM) signal having a plurality of sub-bands; sequentially disabling respective subsets of the plurality of sub-bands in synchronization with a frequency sweep rate and periodicity of a signal tone output by a radio altimeter such that only the respective disabled subsets overlap the signal tone; and transmitting the OFDM signal in a frequency spectrum allocated to the radio altimeter.

Example 12 includes the method of Example 11, wherein each subset of the plurality of sub-bands comprises a single sub-band.

Example 13 includes the method of Example 11, wherein each subset of the plurality of sub-bands comprises two or more sub-bands.

Example 14 includes the method of any of Examples 11-13, wherein disabling each respective subset of the plurality of sub-bands comprises inserting zeros into the portion of the OFDM signal corresponding to each respective subset.

Example 15 includes the method of any of Examples 11-14, wherein each subset of the plurality of sub-bands has a bandwidth equal to or greater than two times a beat bandwidth of the radio altimeter.

Example 16 includes a program product comprising a processor-readable medium on which program instructions are embodied, wherein the program instructions are configured, when executed by at least one programmable processor, to cause the at least one programmable processor to: process an input data stream to form an orthogonal frequency division multiplex (OFDM) signal having a plurality of sub-bands; sequentially disable respective subsets of the plurality of sub-bands in synchronization with a frequency sweep rate and periodicity of a signal tone output by a radio altimeter such that only the respective disabled subsets overlap the signal tone; and output the OFDM signal for transmission in a frequency spectrum allocated to the radio altimeter.

Example 17 includes the program product of Example 16, wherein each subset of the plurality of sub-bands comprises a single sub-band.

Example 18 includes the program product of Example 16, wherein each subset of the plurality of sub-bands comprises two or more sub-bands.

Example 19 includes the program product of any of Examples 16-18, wherein the program instructions are configured to cause the at least one programmable processor to disable each respective subset of the plurality of sub-bands comprises by inserting zeros into the portion of the OFDM signal corresponding to each respective subset.

Example 20 includes the program product of any of Examples 16-19, wherein each subset of the plurality of sub-bands has a bandwidth equal to or greater than two times a beat bandwidth of the radio altimeter.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics system comprising:
   a plurality of avionics components;
   at least one orthogonal frequency division multiplex (OFDM) transmitter coupled to a respective one or more of the plurality of avionics components and configured to transmit a wireless OFDM signal comprising a plurality of sub-bands;
   at least one OFDM receiver coupled to a respective one or more of the plurality of avionics components and configured to receive the wireless OFDM signal transmitted by the OFDM transmitter; and
   a radio altimeter configured to transmit a signal tone that sweeps a frequency spectrum allocated to the radio altimeter at a predefined rate and periodicity;
   wherein the at least one OFDM transmitter is configured to transmit the wireless OFDM signal in the frequency spectrum allocated to the radio altimeter;
   wherein the at least one OFDM transmitter is configured to sequentially turn off respective subsets of the plurality of sub-bands in synchronization with the predefined rate and periodicity of the signal tone frequency sweep.

2. The avionics system of claim 1, wherein each subset of the plurality of sub-bands comprises a single sub-band.

3. The avionics system of claim 2, wherein the single sub-band has a bandwidth equal to or greater than two times a beat bandwidth of the radio altimeter.

4. The avionics system of claim of claim 3, wherein the beat bandwidth is approximately equal to 50 KHz.

5. The avionics system of claim 1, wherein the frequency spectrum allocated to the radio altimeter ranges from 4200 MHz to 4400 MHz.

6. The avionics system of claim 1, wherein the OFDM transmitter is configured to turn off each respective subset of the plurality of sub-bands by inserting zeros into the portion of the OFDM signal corresponding to each respective subset.

7. The avionics system of claim 1, wherein the plurality of avionics components includes the radio altimeter, the radio altimeter being coupled to the OFDM transmitter for transmission of an OFDM signal containing altitude measurements.

8. The avionics system of claim 1, wherein the at least one OFDM transmitter comprises a plurality of OFDM transmitters, each of the plurality of OFDM transmitters integrated into a respective one of the plurality of avionics components.

9. The avionics system of claim 1, wherein the at least one OFDM transmitter is coupled to two or more of the plurality of avionics components such that each of the two or more avionics components communicate wirelessly via the same OFDM transmitter.

10. The avionics system of claim 1, wherein each of the plurality of avionics components comprises one of an actuator, a sensor, or a control unit.

11. A method of communicating data, the method comprising:
processing, in an OFDM transmitter, an input data stream from an avionics component to form an orthogonal frequency division multiplex (OFDM) signal having a plurality of sub-bands;
sequentially disabling respective subsets of the plurality of sub-bands in synchronization with a frequency sweep rate and periodicity of a signal tone output by a radio altimeter such that only the respective disabled subsets overlap the signal tone; and
transmitting the OFDM signal, with the OFDM transmitter, in a frequency spectrum allocated to the radio altimeter.

12. The method of claim 11, wherein each subset of the plurality of sub-bands comprises a single sub-band.

13. The method of claim 11, wherein each subset of the plurality of sub-bands comprises two or more sub-bands.

14. The method of claim 11, wherein disabling each respective subset of the plurality of sub-bands comprises inserting zeros into the portion of the OFDM signal corresponding to each respective subset.

15. The method of claim 11, wherein each subset of the plurality of sub-bands has a bandwidth equal to or greater than two times a beat bandwidth of the radio altimeter.

16. A program product comprising a non-transitory processor-readable medium on which program instructions are embodied, wherein the program instructions are configured, when executed by at least one programmable processor, to cause the at least one programmable processor to:
process, in an OFDM transmitter, an input data stream from an avionics component, to form an orthogonal frequency division multiplex (OFDM) signal having a plurality of sub-bands;
sequentially disable respective subsets of the plurality of sub-bands in synchronization with a frequency sweep rate and periodicity of a signal tone output by a radio altimeter such that only the respective disabled subsets overlap the signal tone; and
output the OFDM signal for transmission by an OFDM transmitter in a frequency spectrum allocated to the radio altimeter.

17. The program product of claim 16, wherein each subset of the plurality of sub-bands comprises a single sub-band.

18. The program product of claim 16, wherein each subset of the plurality of sub-bands comprises two or more sub-bands.

19. The program product of claim 16, wherein the program instructions are configured to cause the at least one programmable processor to disable each respective subset of the plurality of sub-bands comprises by inserting zeros into the portion of the OFDM signal corresponding to each respective subset.

20. The program product of claim 16, wherein each subset of the plurality of sub-bands has a bandwidth equal to or greater than two times a beat bandwidth of the radio altimeter.

* * * * *